United States Patent
Kerr et al.

(10) Patent No.: US 6,340,514 B1
(45) Date of Patent: Jan. 22, 2002

(54) CUSHIONED RUBBER FLOOR MAT ARTICLE COMPRISING AT LEAST ONE INTEGRATED RUBBER PROTRUSION AND AT LEAST TWO LAYERS OF RUBBER

(75) Inventors: Robert C. Kerr; William O. Burke, III, both of LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/374,707

(22) Filed: Aug. 13, 1999

(51) Int. Cl.$^7$ .............................. A47G 9/06; B32B 3/00; B29C 67/00
(52) U.S. Cl. ...................... 428/159; 428/161; 428/172; 428/215; 428/318.6; 264/45.1; 264/46.4; 264/241; 264/297.5; 156/244.27; 156/245; 5/420
(58) Field of Search ................................. 428/158, 161, 428/163, 172, 492, 493, 318.6, 318.8, 159, 215; 156/244.27, 245, 307.3; 264/45.1, 45.5, 46.4, 236, 510, 552, 241, 297.5, 321; 5/417, 420

(56) References Cited

U.S. PATENT DOCUMENTS

| | | | | |
|---|---|---|---|---|
| 1,805,038 A | * | 5/1931 | Derr ............................ 428/493 |
| 3,016,317 A | | 1/1962 | Brunner ........................ 154/49 |
| 3,197,357 A | | 7/1965 | Schulpen .................... 161/116 |
| 4,262,048 A | | 4/1981 | Mitchell ........................ 428/99 |
| 4,377,016 A | * | 3/1983 | Niermeijer ................... 428/167 |
| 4,710,415 A | | 12/1987 | Slosberg et al. ............... 428/48 |
| 4,794,027 A | * | 12/1988 | Hering ........................ 428/68 |
| 4,822,669 A | | 4/1989 | Roga ........................... 428/287 |
| 5,443,885 A | | 8/1995 | Wilson ........................ 428/121 |
| 5,645,914 A | | 7/1997 | Horowitz ...................... 428/81 |

FOREIGN PATENT DOCUMENTS

| | | |
|---|---|---|
| JP | 67224 | 6/1978 |
| JP | 2544659 | 10/1984 |

* cited by examiner

Primary Examiner—Donald J. Loney
(74) Attorney, Agent, or Firm—Terry T. Moyer; William S. Parks

(57) ABSTRACT

This invention relates to a cushioned dust control mat article wherein the mat comprises at least two distinct layers of rubber, one comprising foam rubber, the other comprising solid rubber. The solid rubber layer is present over the foam rubber layer on the side of the mat in which at least one integrated rubber protrusion is present to provide cushioning characteristics. The solid rubber layer acts as a cap or barrier for the foam rubber layer, particularly over the integrated protrusion or protrusions, in order to provide a mat which is resilient, will not easily degrade in its modulus strength after appreciable use and/or washing within industrial cleaning processes, and will not exhibit appreciable cracking or breaking, particularly within the integrated protrusion(s), after standard use for pedestrian traffic. A method of producing such an inventive cushioned floor mat article is also provided.

14 Claims, 2 Drawing Sheets

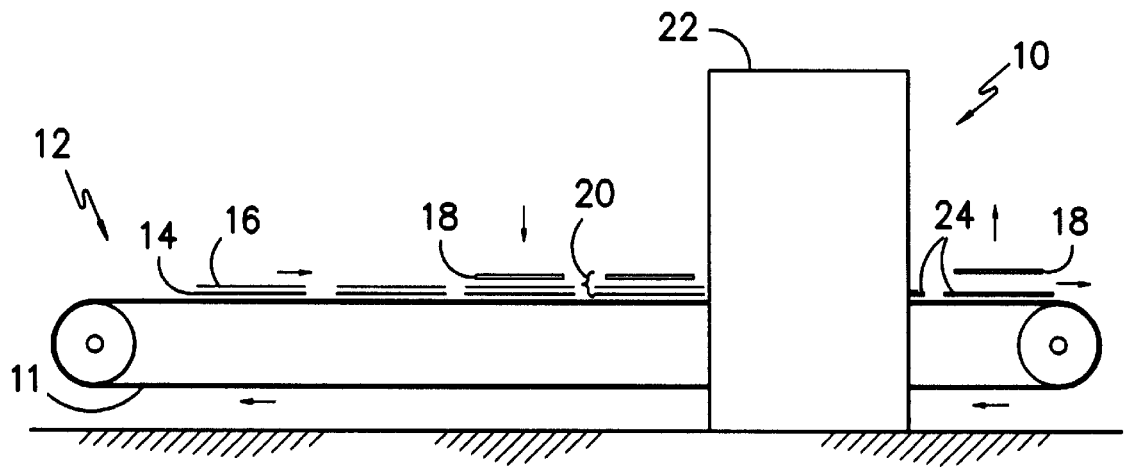
FIG. -1-
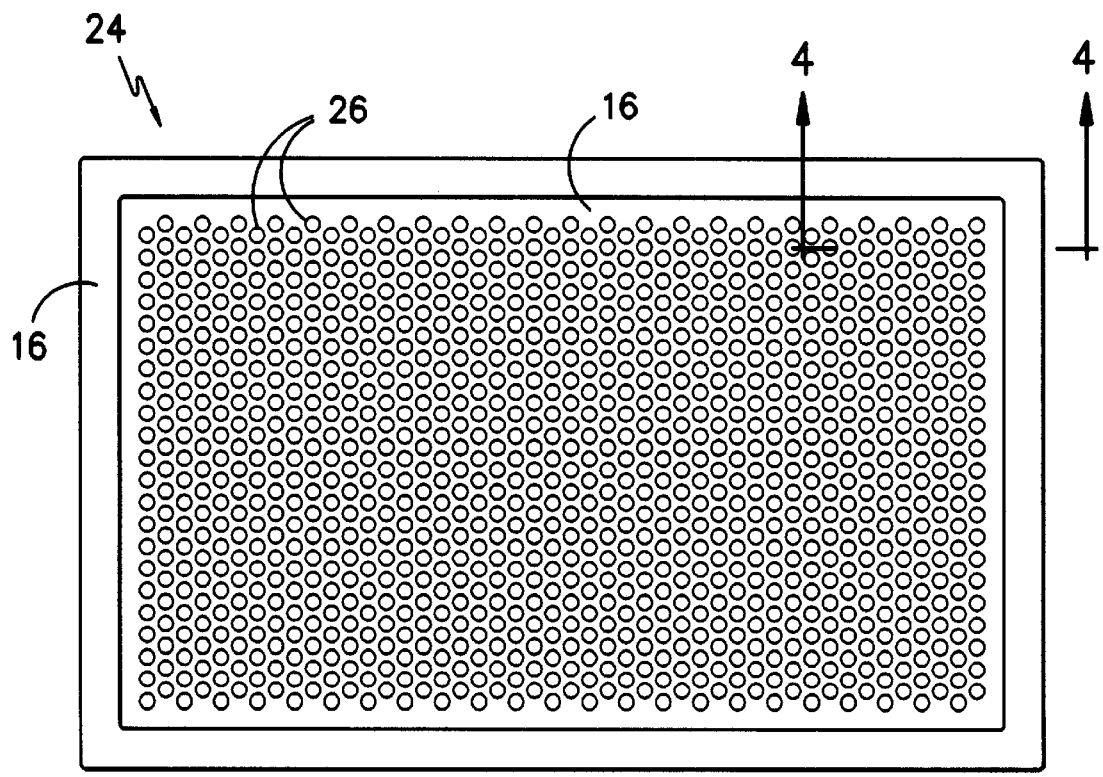
FIG. -2-

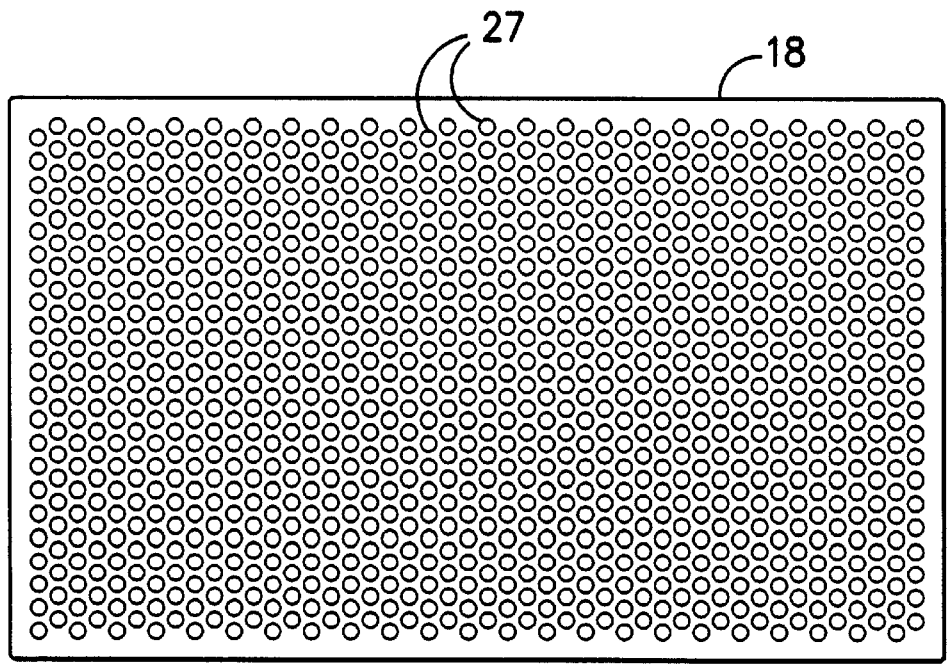
FIG. -3-
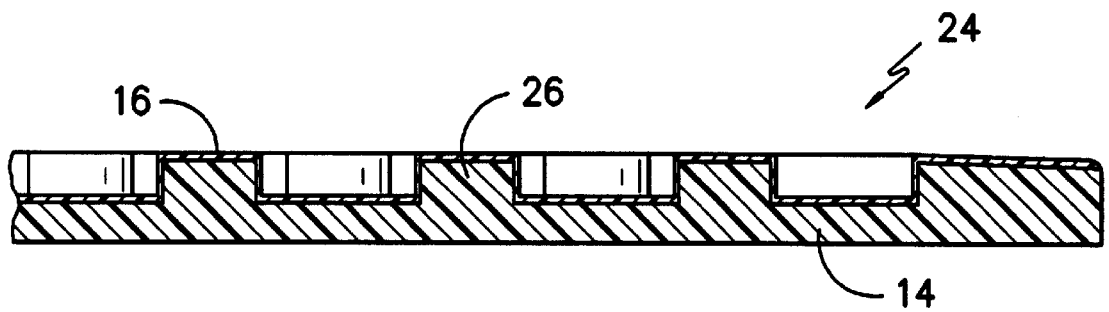
FIG. -4-

CUSHIONED RUBBER FLOOR MAT ARTICLE COMPRISING AT LEAST ONE INTEGRATED RUBBER PROTRUSION AND AT LEAST TWO LAYERS OF RUBBER

FIELD OF THE INVENTION

This invention relates to a cushioned dust control mat article wherein the mat comprises at least two distinct layers of rubber, one comprising foam rubber, the other comprising solid rubber. The solid rubber layer is present over the foam rubber layer on the side of the mat in which at least one integrated rubber protrusion is present to provide cushioning characteristics. The solid rubber layer acts as a cap or barrier for the foam rubber layer, particularly over the integrated protrusion or protrusions, in order to provide a mat which is resilient, will not easily degrade in its modulus strength after appreciable use and/or washing within industrial cleaning processes, and will not exhibit appreciable cracking or breaking, particularly within the integrated protrusion(s), after standard use for pedestrian traffic. A method of producing such an inventive cushioned floor mat article is also provided.

DISCUSSION OF THE PRIOR ART

All U.S. patent cited herein are hereby filly incorporated by reference.

Floor mats have long been utilized to facilitate the cleaning of the bottoms of people's shoes, particularly in areas of high pedestrian traffic such as doorways. Moisture, dirt, and debris from out of doors easily adhere to such footwear, particularly in inclement weather and particularly in areas of grass or mud or the like. Such unwanted and potentially floor staining or dirtying articles need to be removed from a person's footwear prior to entry indoors. As will be appreciated, such mats by their nature must undergo frequent repeated washings and dryings so as to remove the dirt and debris deposited thereon during use. These mats are generally rented from service entities which retrieve the soiled mats from the user and provide clean replacement mats on a frequent basis. The soiled mats are thereafter cleaned and dried in an industrial laundering process (such as within rotary washing and drying machines, for example) or by hand and then sent to another user in replacement of newly soiled mats.

Uncarpeted anti-fatigue dust control mats have been made in the past comprised of dense rubber, scrap rubber, sponge-like material, including PVC, vinyl polymers, and polyurethanes, as well as recycled tire rubber. The mats are generally not able to be washed in industrial cleaning applications (such as rotary washing machines) since they are either too heavy or dense (and thus either damage the machine or themselves) or either deteriorate too easily (since sponge-like materials are easy to tear apart, particularly in rotary cleaning applications). Such washability is a key to providing a suitable floor mat article within the standard rental laundry market. As such, it has been very difficult to produce uncarpeted cushioned floor mats which exhibit sufficient strength to withstand vigorous cleaning and laundering associated with industrial rental laundry services. Foam rubber has only recently been utilized within dust control mats as a manner of reducing the overall mass of the mat article to facilitate movement and cleaning (such as in U.S. Pat. No. 5,305,565 to Nagahama et al.). Also, cushioned mats have been produced, generally including portions of the mat which contain discrete areas of integrated rubber increasing the surface area of the mat in three axes, which thereby provide cushioned areas on which a pedestrian may step. However, to date, there have not been any mats comprising integrated rubber protrusions which not only permit repeated industrial washings without exhibiting appreciable degradation of the mat structure but also provide excellent cushioning effects to pedestrian users for more comfortable floor and ground covering as well as provide a surface to clean such pedestrians' footwear. The closest art, U.S. Pat. No. 3,016,317 to Brunner, discusses a gymnasium mat having a bottom layer of foam polyvinyl chloride, a middle layer of adhesive film and a protective layer, of preferably vinyl, over top of the first two layers. Such a mat does not discuss the importance of a solid rubber cap directly adhered to a foam rubber component (which aids with cost concerns, strength of the overall structure, and shape retention upon continued pedestrian use). Nor does patentee consider the importance of washability of such a mat since the two layers would most likely easily separate and the foam component could not withstand rigorous industrial laundering within damaging or deteriorating. As such, there still exists a need to provide a durable, cushioned dust control mat which can withstand random and continuing pressures from pedestrians without appreciably losing its cushioning characteristics. To date, the prior art has neither taught nor fairly suggested such a dust control mat product.

DESCRIPTION OF THE INVENTION

It is thus an object of this invention to provide a durable, cushioned dust control mat which permits cleaning of a pedestrian's footwear. Furthermore, it is an object of the invention to provide a durable, cushioned dust control mat in which the cushioning aspects are provided by at least one integrated rubber protrusion produced during the necessary vulcanization process. Still other objects of the invention is to provide a cushioned all-rubber floor mat which retains its cushioning characteristics and shape upon use and can be laundered repeatedly within industrial rotary washing machines without damaging such machines or themselves.

Accordingly, this invention encompasses a rubber floor mat structure comprising at least two separate layers of rubber wherein said at least two layers comprise a first layer comprised of foam rubber; and a second layer comprised of solid rubber;

wherein at least one protrusion integrated within said rubber mat structure is present having a core portion and an outside surface portion, wherein the core portion of said at least one protrusion is comprised of said first layer of foam rubber and wherein the outside surface portion of said at least one protrusion is comprised of said second layer of solid rubber.

The first rubber layer may be comprised of any standard rubber composition, including, but not limited to, acrylonitrile-butadiene rubber (NBR), styrene-butadiene rubber (SBR), carboxylated NBR, carboxylated SBR, chlorinated rubber, silicon-containing rubber, and the like, all of which must include a blowing agent to form the necessary closed-cell structure of the resultant foam rubber, such as in U.S. Pat. No. 5,305,565 to Nagahama et al. For cost purposes, the preferred rubbers are NBR, SBR, and blends thereof.

As noted above, the foam rubber component is of utmost necessity in this inventive floor mat. Dust control mats have exhibited general problems arising from frequent washings and harsh environments of use. First, the energy required to wash and dry a typical floor mat is significant due to the overall mass of the mats. The overall mass is most significantly attributed to the mass of the rubber within the mat. As will be appreciated, a reduction in the overall mass of the floor mat will result in a reduced energy requirement in washing and drying the mat. Moreover, a relative reduction in the mass of the rubber will provide the most substantial benefit. Thus, the utilization of a lighter weight rubber composition, such as foam rubber, in at least a portion of the dust control mat of the present invention includes a rubber backing sheet which may possess a specific gravity which is approximately 25 to 35 percent less then the rubber sheets of typical prior floor mats. Accordingly, a foam rubber is required as the bottom layer of the mat and the core layer of the integrated rubber protrusion(s) of this invention. Such a foam rubber layer is present as a thicker layer than the solid rubber cap (generally). The target thickness for such a first layer is from about 5 to about 500 mils, preferably from about 25 to about 400 mils, more preferably from about 40 to about 250 mils, and most preferably from about 75 to about 200 mils. The resultant lighter weight of the mat structure thus translates into a reduced possibility of the mat harming either the washing or drying machine in which the mat is cleaned, or the mat being harmed itself during such rigorous procedures. Although the inventive floor mat must withstand the rigors of industrial machine washing, hand washing and any other manner of cleaning may also be utilized. Foam rubber also permits the retention or return to the original shape of the mat after continuous pedestrian use. Overall, the inventive floor mat provides an article which will retain its aesthetically pleasing characteristics over a long period of time and which thereby translates into reduced costs for the consumer.

The second rubber layer must then comprise a solid rubber composition. Such a solid rubber may be comprised of any standard type of rubber, such as acrylonitrile-butadiene (NBR) or styrene-butadiene (SBR), or carboxylated derivatives of such butadienes, EPDM, and the like (i.e., those noted above but without the addition of a blowing agent), all merely as examples. Preferably, the second layer is comprised of NBR. The target thickness for such a second layer is from about 2 to about 50 mils, preferably from about 4 to about 40 mils, more preferably from about 5 to about 35 mils, and most preferably from about 5 to about 25 mils. This layer is preferably placed on top of the foam rubber first layer as to cover the entire first layer prior to vulcanization. However, this second layer may also merely cover a portion of the first layer, if desired. Once the second layer is placed directly on top of the first layer, a die mold is then placed on top of the second layer which comprises opening through which molten rubber may flow during vulcanization and pressing of the structure. The high pressures (about 15 to about 50 psi, preferably 20 to 40 psi) and temperatures (about 250 to about 350° F., preferably from about 280 to about 300° F.) associated with vulcanization thus melt and force a certain amount of the two layers through the die mold openings. The denser solid rubber does not permit the less dense blown foam rubber to protrude through the solid rubber layer during this procedure. As such, the resultant protrusions possess foam rubber cores and solid rubber caps. Such protrusions add to the overall surface of the top of the mat structure, thus the solid rubber layer is appreciably thinner after vulcanization and molding than after the initial placement step. However, the solid rubber layer still remains intact and possesses sufficient strength to protect the foam rubber from contact with pedestrians' footwear, atmospheric conditions, and sunlight. The resultant mat thus is intended to be used with the protrusions facing toward the pedestrian. However, a die mold may also be placed beneath the unvulcanized structure such that protrusions may be formed on both sides (with or without a solid rubber layer capping such foam rubber protrusions), if desired. The inventive mat must merely possess a two-layer structure with accompanying protrusions therein.

Furthermore, a significant problem exists within this field concerning the deterioration of the carbon-carbon double bonds in the matrix of the rubber backing sheet due to the exposure of the sheets to an oxidizing environment during use and cleaning. Specifically, the exposure of the mats to oxidizing agents during the washing and drying process tends to cleave the carbon-carbon double bonds of the rubber sheet thereby substantially embrittling the rubber which leads to cracking under the stress of use. In addition to the laundering process, the exposure of the mats to oxygen and ozone, either atmospheric or generated, during storage and use leads to cracking over time. The mat of the present invention may thus include an ozone-resistance additive, such as ethylene-propylene-diene monomer rubber (EPDM), as taught within U.S. Pat. No. 5,902,662, to Kerr, which provides enhanced protection to the rubber backing sheet against oxygen in order to substantially prolong the useful life of the mat. Such an additive also appears to provide a reduction in staining ability of such rubber backed mats upon contact with various surfaces, such as concrete, wood, and a handler's skin, just to name a few, as discussed in U.S. patent application Ser. No. 09/113,842 to Rockwell, Jr. now U.S. Pat. No. 6,159,576.

The term "integrated rubber protrusion" is intended to encompass any type of protrusion from the rubber mat sheet which is formed from the same rubber compositions of the required two separate layers of rubber and is not attached in any manner to the resultant backing sheet after vulcanization. Thus, such a protrusion would be produced through the melting of the rubber composition during vulcanization and allowing molten rubber to flow through a die mold in a position in which it remains until it cures and sets. The shape of such a protrusion is virtually limitless, and may be of any size. As noted above, the majority of the mat structure (the first layer) is a rubber including a blowing agent (to produce a foam rubber) and a second layer of solid rubber covers this foam rubber portion. In such a manner, the protrusions are formed with a core of foam rubber and a cap of solid rubber upon vulcanization through a die-mold. The separate protrusions thus provide discrete areas of relaxed stress within the inventive mat (particularly with the core of softer foam rubber) which thus provides a cushioning effect to a pedestrian, greater than for an overall flat foam rubber structure.

With regard to the die, it may be constructed of any material which can withstand vulcanization temperatures (i.e., between about 250° F. and about 400° F.) and pressures (i.e., between about 15 psi and 50 psi, generally). Thus, any metal may be utilized, such as aluminum, titanium, and the like, certain plastics, such as Teflon®, for example, silicon molds, and the like. Preferably, the die is made of steel, is generally square or rectangular in shape (although any shape may be utilized), and comprises holes throughout to ultimately form the desired protrusions. Preferably, such holes are circular in shape (at the die surface) and cylindrical as well (i.e., circular on both surfaces with the same shape throughout the die from one surface to the other). Furthermore, such a die may also be utilized in an in-line process wherein there is no need to hand place the backing sheet over the die itself. The preferred procedure is outlined more particularly below.

The inventive mat provides a long-lasting, industrially washable, cushioned rubber floor mat which provides comfort to users as well as significantly increased duration of utility and continuity of aesthetic and modulus strength characteristics. All of this translates into reduced cost for the consumer as costs to produce are lower, the need to replace such mats is greatly reduced over other anti-fatigue, cushioned mat products, and possible medical and insurance costs may also be reduced with the utilization of such specific cushioned mats which also work to remove dirt and moisture from pedestrians' footwear.

BRIEF DESCRIPTION OF THE DRAWINGS

FIG. 1 is a schematic representation of a floor mat manufacturing machine.

FIG. 2 is an aerial view of the components of a preferred embodiment of the inventive floor mat.

FIG. 3 is an aerial view of the preferred die.

FIG. 4 is a cross-sectional view along lines 4 of FIG. 2.

DETAILED DESCRIPTION OF THE DRAWINGS

While the invention will be described in connection with certain preferred embodiments and practices, it is to be understood that it is not intended to in any way limit the invention to such embodiments and practices. On the contrary, it is intended to cover all alternatives, modifications and equivalents as may be included within the spirit and scope of the invention as defined by the appended claims.

Turning now to the drawings wherein like elements are designated by like reference numerals in the various views, FIG. 1 shows a floor mat manufacturing machine 10 for producing the inventive dust control mat 24. The machine 10 comprises a conveyor belt 11 which carries the mat components 14, 16 from an initial placement area 12 (where each component is placed in sequence) through a vulcanization chamber 22. Thus, a first layer of rubber (including a blowing agent) 14 is first placed on the belt 11. On top of the first rubber layer 14 is then placed a second solid rubber layer 16, followed by a metal die 18. The first rubber layer 14 has a thickness of about 40 mils and the second solid rubber layer 16, being much thinner, has a thickness of about 5 mils. The resultant combination 20, including the metal die 18, is then moved into the vulcanization chamber 22, which includes a heated press (not illustrated) to subject the mat components to a temperature of about 290° C. and a pressure of about 30 psi. After vulcanization, the finished mat 24 is allowed to cool and the die 18 can then be removed from the mat 24.

FIG. 2 gives a more detailed aerial view of the inventive mat 24. The top cover for the mat 24 is the second solid rubber layer 16. In an alternative embodiment, the second solid rubber layer may cover only a portion of the foam rubber layer (14 of FIG. 1). The inventive mat 24 includes integrated rubber protrusions 26 which are circular in shape and cylindrical in configuration as they protrude from the mat 24. These protrusions 26 provide the cushioning benefits as described more fully above for an antifatigue floor covering product.

The preferred die 18 is more thoroughly depicted in FIG. 3. The die is preferably about 2 inches tall and made of steel. Any material may be used for this die 18 as long as it can withstand vulcanization temperatures and pressures without distorting its shape or permanently adhering to the mat product (24 of FIG. 1) (such as, as merely examples, other metals like titanium, aluminum, and the like; fibers, such as polyaramid structures, and the like; silicon molds; and ceramics). The preferred die 18 comprises a plurality of cut-outs 27 which are, again preferably, circular in shape, and thus cylindrical in configuration, having a diameter of about 1 inch and a depth of 2 inches. It is through these holes 27 that the rubber composition of the first foam rubber layer (14 of FIG. 1) and the second solid rubber layer (16 of FIG. 1) are pressed to ultimately form the desired protrusions (26 of FIGS. 2 and 4) on the bottom side of the preferred mat (24 of FIG. 1).

FIG. 4 thus shows a cross-section of a portion of the finished inventive floor mat 24. Protrusions 26 have been formed comprising a foam rubber core from the first rubber layer 14 and a cap comprising the second solid rubber layer 16. The resultant preferred protrusions 26 are each about 1 inch in diameter and about 2 inches in length. The thickness of the solid rubber layer 16 after vulcanization has been reduced from about 5 mils to about 2 mils due to the associated pressures and the forcing of the rubber compositions 14, 16 through the metal die (18 of FIG. 1) during vulcanization.

DETAILED DESCRIPTION OF THE INVENTION

As previously indicated, in the preferred embodiment of the present invention the base material for the first foam rubber layer is acrylonitrile-butadiene rubber (NBR) or styrene-butadiene rubber (SBR). Other materials which may also be used include, by way of example, hydrogenated NBR, carboxylated NBR, EPDM, and generally any other standard types of rubbers which may be formed in a foam state. As will be appreciated, the use of NBR or SBR is desirable from a cost perspective.

The present invention makes use of the addition of chemical blowing agents to the rubber materials ultimately yielding a lighter rubber sheet. Specifically, the rubber backing sheet of the present invention comprises either NBR or SBR or both mixed with a blowing agent. The rubber/blowing agent mixture is thereafter calendared as a solid sheet of unvulcanized. In practice, the raw NBR is believed to be available from Miles Inc. Rubber Division in Akron, Ohio. The SBR may be purchased from Goodyear Tire and Rubber Company in Akron, Ohio. EPDM may also be added in a preferred embodiment to provide ozone resistance and other properties.

In the preferred practice of the present invention, a masterbatch of the polymer components is first prepared by mixing the base rubber (either NBR or SBR) with the additive ozone resistant polymer (EPDM) in the desired ratio along with various stabilizers and processing agents. Exemplary compositions of the masterbatch for various additive ratios wherein EPDM is mixed with NBR are provided in Table 1A for ratios of NBR to the additive polymer of 9.0 (Column a), 2.3 (Column b) and 1.2 (Column c).

TABLE 1A

| MATERIAL | PARTS BY WEIGHT | | |
|---|---|---|---|
| | a | b | c |
| Rubber (NBR) | 40 | 25 | 50 |
| Additive Rubber (EPDM) | 60 | 75 | 50 |
| Plasticizer | 10 | 5 | 15 |
| Stabilizer | 2 | 2 | 2 |
| Processing Aid | 1.75 | 1.75 | 1.75 |
| Antioxidant | 1.2 | 1.2 | 1.2 |

In the preferred practice the plasticizer which is used is diisononylphthalate. The stabilizer is trinonylphenolphosphate available from Uniroyal Chemical under the trade designation Polyguard™. The processing aid is purchased from the R. T. Vanderbilt Company in Norwalk Conn. under the trade designation Vanfree™ AP-2. The antioxidant is purchased from Uniroyal Chemical under the trade designation Octamine™.

Following the mixing of the masterbatch, curative agents are added in a second stage mixing process for formation of the raw rubber compound which forms the backing sheet of the floor covering article of the present invention. An exemplary composition of the raw rubber compound formed in this second stage mixing process is provided in Table 1B.

TABLE 1B

| MATERIAL | PARTS BY WEIGHT |
|---|---|
| Masterbatch Blend | 100 |
| Sulfur | 1.25 |
| Stearic Acid | 1 |
| Carbon Black N-550 | 40 |
| Vulkacit Thiaram MS (TMTM) | 0.5 |
| Zinc Oxide | 5 |
| Blowing Agent | 2.5 |

Examplary compositions of the masterbatch for various additive ratios of SBR to EPDM are provided in Table 2A in a manner similar to that of Table 1A.

TABLE 2A

| | PARTS BY WEIGHT | | |
|---|---|---|---|
| MATERIAL | a | b | c |
| Rubber (SBR) | 40 | 25 | 50 |
| Additive Polymer (EPDM) | 60 | 75 | 50 |
| Stearic Acid | 1 | 1 | 1 |
| Sunolite 240 | 2 | 2 | 2 |
| Zinc Oxide | 5 | 5 | 5 |
| Carbon Black N-550 | 30 | 30 | 30 |
| Carbon Black N-224 | 60 | 60 | 60 |
| Calcium Carbonate | 35 | 35 | 35 |
| Talc | 30 | 30 | 30 |
| Supar 2280 | 80 | 80 | 80 |

After mixing of the SBR masterbatch, curative agents are preferably added in a second stage mixing process for formation of the raw rubber compound which forms the backing sheet of the floor covering article of the present invention. An exemplary composition of the raw rubber compound formed in this second stage mixing process is provided in Table 2B.

TABLE 2B

| MATERIAL | PARTS BY WEIGHT |
|---|---|
| Masterbatch Blend | 100 |
| Sulfur | 2 |
| Methyl Zimate | 1.25 |
| Butyl Zimate | 1.25 |
| Dibutyl Thiurea | 2.50 |
| Tellurium Diethyldithiocarbanate | 1 |
| Blowing Agent | 2.0 |

As previously indicated and shown above, the first foam rubber layer includes a blowing agent to effectuate the formation of closed gas cells in the rubber during vulcanization. The second solid rubber is thus preferably the same compositions as those listed above but without the addition of a blowing agent. Such a second layer is also preferably calendared to a thickness far thinner than for the first foam rubber layer in order to form the required solid rubber cap. The blowing agent for the first foam rubber layer is preferably a nitrogen compound organic type agent which is stable at normal storage and mixing temperatures but which undergoes controllable gas evolution at reasonably well defined decomposition temperatures. By way of example only and not limitation, blowing agents which may be used include: azodicarbonamide (Celogen™ AZ-type blowing agents) available from Uniroyal Chemical Inc. in Middlebury Conn. and modified azodicarbonamide available from Miles Chemical in Akron, Ohio under the trade designation Porofor™ ADC-K.

It has been found that the addition of such blowing agents at a level of between about 1 and about 5 parts by weight in the raw rubber composition yields a rubber sheet having an expansion factor of between about 50 and 200 percent. After the fluxing processes are completed, the uncured first rubber layer containing EPDM and the blowing agent are assembled with the second unvulcanized solid rubber layer placed over the first as previously described. A die, as previously described, is then placed over the second layer. The vulcanization of the two rubber layers is then at least partially effected within the press molding apparatus wherein the applied pressure is between 20 and 40 psi. Under the high temperatures and pressure, the nitrogen which is formed by the blowing agent partly dissolves in the rubber. Due to the high internal gas pressure, small closed gas cells are formed within the first rubber layer as the pressure is relieved upon exit from the press molding apparatus. In an alternative practice a post cure oven may be used to complete the vulcanization of the mat and provide additional stability to the resulting product.

EXAMPLE

Two separate rubber sheet materials were produced by fluxing together the materials as set forth in Table 1A in a standard rubber internal mixer at a temperature of about 280° F. to 300° F. for a period of one to two minutes. EPDM additions were made as shown in Table 1A to yield a ratio of EPDM to NBR of 3.0. Additions of curative agents as provided in Table 1B were then made for two separate rubber sheets, however, the second did not include the blowing agent. The first sheet, including the blowing agent, being an uncured sheet of the fluxed rubber compounds was then calendared to a thickness of about 40 mils, having a width of approximately 3 feet and a length of approximately 4 and-a-half feet. The second sheet, also being uncured, was then calendared to a thickness of about and having the same dimension as the first sheet. The first sheet was then placed on a silicon mold (to form cleats in the ultimate floor mat) and covered entirely on its surface with the second sheet. A die mold having a plurality of cylindrically configured openings was then placed over the second sheet. The die mold was approximately 2 feet, 8 inches wide and 4 feet 2 inches long. The die mold/rubber sheets composite was then cured at a temperature of about 290° F. for five (15) minutes under a pressure of about 40 psi and post-cured at a temperature of about 290° F. at atmospheric pressure for a period of five (15) minutes. The resultant floor mat possessed a border of solid rubber reinforcement around the perimeter of the structure of four inches wide as well as a middle section comprising a plurality of cylindrically configured protrusions having a solid rubber cap over a foam rubber core. Cleat structures were also present on the bottom of the vulcanized first rubber sheet. The first and second layers of rubber became permanently adhered together as well. The resultant mat article provided a significant amount of cushioning.

A similar mat comprised of all solid rubber but with the same configurations and number of integrated rubber protrusions was also produced and tested against the inventive mat for washability, abrasion resistance, compression, and resiliency. On an empirical scale of 1 to 5, in which 5 is considered the best, the inventive mat exhibited a rating of 5 as to visual appearance after 200 industrial washings in a rotary washing machine. The comparative solid rubber mat could not be washed at all in such a manner without damaging the machine. Abrasion resistance was tested through the utilization of a rotating foot mechanism to simulate foot traffic where one thousand cycles is interpreted as about one year of use. The inventive mat rated a 4 on the visual appearance scale after such a duration; the comparative mat rated a 1. Compression testing concerned the force necessary to reduce material height by 25% of its original height. A greater amount indicated a more cushioned product (and thus a better product for continuous pedestrian use or for use as a floor covering for an appreciable amount of time). The inventive mat exhibited an ease of compression 5 times greater than that for the comparative mat. Lastly, resiliency was tested as the measurement of the height percent recovered after 50% compression at 120° F. for 24 continuous hours. Such a test thus concerns the ability of the mat to retain its shape after long durations of use. The inventive mat exhibited a resiliency of above 90% after such a harsh test while the competitive mat was below 40%. Thus, in all the aforementioned tests, the utilization of a specific solid rubber cap over a foam rubber layer, as well as the presence of protrusions possessing the same type of two-layer arrangement, provided a far superior mat product in terms of comfort, resiliency, and washability.

While the invention has been described and disclosed in connection with certain preferred embodiments and procedures, these have by no means been intended to limit the invention to such specific embodiments and procedures. Rather, the invention is intended to cover all such alternative embodiments, procedures, and modifications thereto as may fall within the true spirit and scope of the invention as defined and limited only by the appended claims.

We claim:

1. A cushioned rubber floor mat capable of withstanding rigorous industrial machine washing procedures comprising a rubber mat structure comprising
   at least a first layer comprised of foam rubber; and
   at least a second layer comprised of solid rubber having a thickness of between about 2 to about 50 mils, wherein said rubber is selected from NBR, SBR, carboxylated NBR, carboxylated SBR, chlorinated rubber, silicon-containing rubber, EPDM, and any mixtures thereof;
   wherein at least one protrusion integrated within said rubber mat structure is present having a core portion and an outside surface portion, wherein the core portion of said at least one protrusion is comprised of said first layer of foam rubber, wherein the outside surface portion of said at least one protrusion is comprised of said second layer of solid rubber.

2. The floor mat of claim 1 wherein said at least one protrusion integrated within said mat structure is substantially cylindrical in shape.

3. The floor mat of claim 1 where a plurality of protrusions integrated within said rubber mat structure is present.

4. The floor mat of claim 1 wherein the thickness of the resultant first layer of foam rubber is from about 5 to about 500 mils and wherein said foam rubber is selected from NBR, SBR, carboxylated NBR, carboxylated SBR, chlorinated rubber, silicon-containing rubber, EPDM, and any mixtures thereof.

5. The floor mat of claim 4 wherein the thickness of the resultant first layer of foam rubber is from about 25 to about 400 mils and the thickness of the resultant second layer of solid rubber is from about 4 to about 40 mils.

6. The floor mat of claim 5 wherein the thickness of the resultant first layer of foam rubber is from about 40 to about 250 mils and the thickness of the resultant second layer of solid rubber is from about 5 to about 35 mils.

7. The floor mat of claim 6 wherein the thickness of the resultant first layer of foam rubber is from about 75 to about 200 mils and the thickness of the resultant second layer of solid rubber is from about 5 to about 25 mils.

8. A method of forming a cushioned dust control mat comprising the steps of
   (a) laying at least a first layer of unvulcanized solid rubber over at least a portion of at least a second layer of unvulcanized rubber further comprising at least one blowing agent to form a closed-cell foam rubber structure upon vulcanization, wherein said second layer of unvulcanized rubber has a thickness of from about 2 to about 50 mils and comprises rubber selected from the group consisting of NBR, SBR, carboxylated NBR, carboxylated SBR, chlorinated rubber, silicon-containing rubber, EPDM, and any mixtures thereof;
   (b) placing a die having at least a first and second side over at least a portion of said first layer of unvulcanized solid rubber, wherein said die has at least one portion thereof removed to allow for the entry of molten rubber, and wherein said die is comprised of a material which can withstand vulcanization temperatures and pressures; and
   (c) subjecting the resultant composite comprising the first and second layers of unvulcanized rubber and the die to vulcanization temperatures and pressures to (1) attach the first layer of rubber to said second layer of rubber, and (2) to form at least one rubber protrusion through the removed portions of the die, wherein said resultant rubber protrusion comprises a core of foam rubber and an outside surface of solid rubber; wherein said the thickness of said second layer of rubber is from about 2 to about 50 mils.

9. The method of claim 8 wherein the thickness of the resultant first layer of foam rubber is from about 5 to about 500 mils and wherein said foam rubber is selected from NBR, SBR, carboxylated NBR, carboxylated SBR, chlorinated rubber, silicon-containing rubber, EPDM, and any mixtures thereof.

10. The method of claim 9 wherein the thickness of the resultant first layer of foam rubber is from about 25 to about 400 mils and the thickness of the resultant second layer of solid rubber is from about 4 to about 40 mils.

11. The method of claim 10 wherein the thickness of the resultant first layer of foam rubber is from about 40 to about 250 mils and the thickness of the resultant second layer of solid rubber is from about 5 to about 35 mils.

12. The method of claim 11 wherein the thickness of the resultant first layer of foam rubber is from about 75 to about 200 mils and the thickness of the resultant second layer of solid rubber is from about 5 to about 25 mils.

13. The method of claim 8 wherein the removed portions of said die of step "b" permit contact of said molten rubber with both said first side and said second side of said die.

14. The method of claim 13 wherein said removed portions of said die are substantially circular in shape on the surface of both of said first and second sides of said die.

* * * * *